July 29, 1952     F. B. WOESTEMEYER     2,604,785
ELECTRICAL MOISTURE METER
Filed March 29, 1949
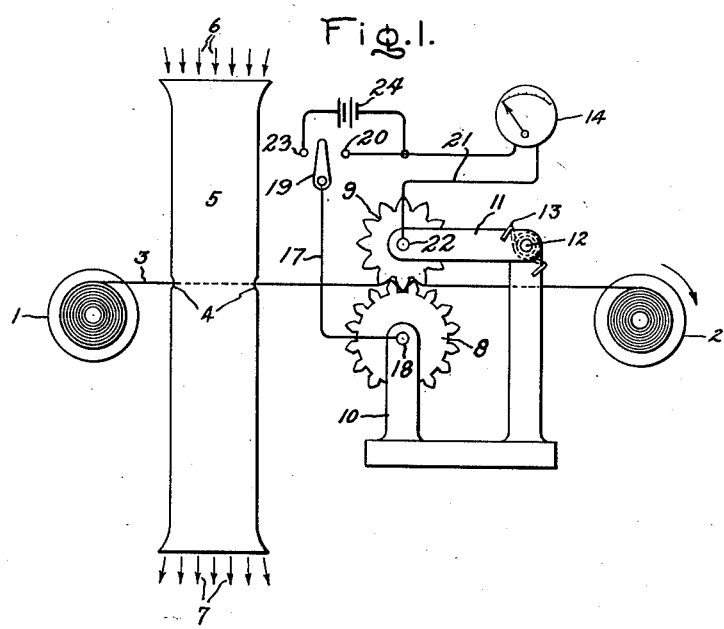
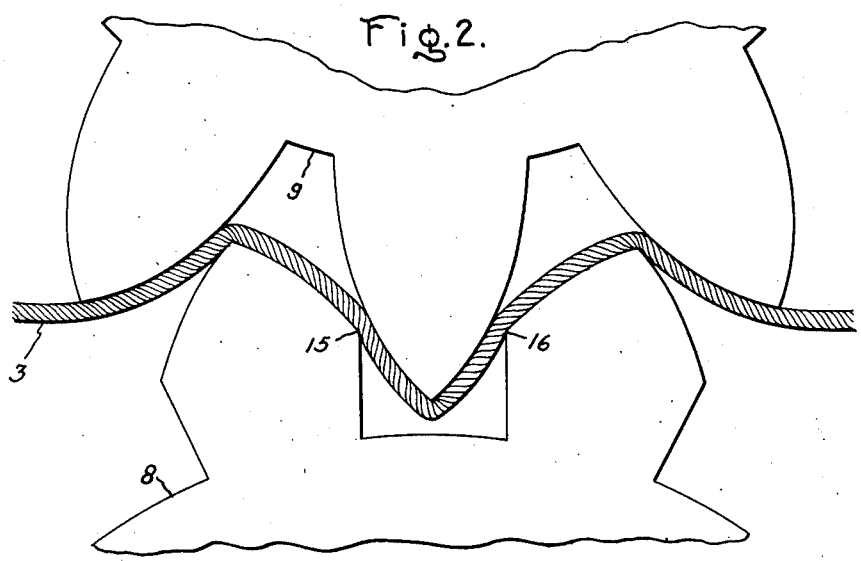
Inventor:
Francis B. Woestemeyer,
by Merton O. Moore
His Attorney.

Patented July 29, 1952

2,604,785

UNITED STATES PATENT OFFICE 2,604,785

ELECTRICAL MOISTURE METER

Francis B. Woestemeyer, Schenectady, N. Y., assignor to General Electric Company, a corporation of New York Application March 29, 1949, Serial No. 84,204

7 Claims. (Cl. 73—335)

This invention relates generally to electrical contact brushes or electrodes and more particularly to a type of electrode for making contact with a moving tape or thread.

In certain types of apparatus for determining the moisture or water content of clouds, a dielectric thread or tape, impregnated with a dehydrated electrolyte, is used as a primary detector of moisture. Such apparatus includes in addition, means for causing a selected sample of the atmosphere to flow by a moving portion of such a thread so as to permit it to absorb an amount of moisture which varies as a function of the water content of the atmosphere. The portion of thread which has been exposed may subsequently be passed between a pair of electrodes connected in a circuit for measuring variation in the resistance of the thread, thereby providing an indication of the water content of the atmosphere.

In another type of apparatus for the same purpose, the thread is drawn through a pair of electrodes composed of substances occupying different levels in the electromotive series of elements. With this type of apparatus, a suitable meter connected across the contact electrodes provides the indication of the moisture content. A more complete description of an apparatus of the first type is provided in United States patent application No. 786,603 of Vincent J. Schaeffer, entitled "Electrical Moisture Meter" and filed on November 18, 1947, now Patent No. 2,532,822. Likewise, a more complete description of an apparatus of the second type is described in the copending United States patent application No. 81,568 of Howard I. Becker, entitled "Electrical Moisture Indicator," and filed on March 15, 1949. Both the above mentioned applications are also assigned to the same assignee as the present invention.

In the apparatus used heretofore, including that described in the above-mentioned applications, it has been found quite difficult to provide a firm and constant contact with the moving thread. This is due in part to the fact that the thread is not perfectly smooth, and also to the fact that the thread has a tendency to swell unevenly in spots due to droplets of water condensing upon it. Recourse has been had to multiple contacts as a solution to this difficulty, but this has not proved to be very satisfactory because of the increased friction on the thread.

Accordingly, it is an object of my invention to provide a new and improved device for making an electrical contact to a moving thread or tape.

Another object of my invention is to provide a device for making an electrical contact to both sides of a moving thread at closely adjacent points.

A further object of my invention is to provide a device for making contact to both sides of a moving thread by means of a pair of dissimilar substances occupying different levels in the electromotive series.

A still further object of my invention is to provide a device for making a pair of contacts to a moving thread and for insuring at all times a pair of high pressure points in the contact with a minimum amount of friction on the thread.

For further objects and advantages and for a better understanding of the invention, attention is now directed to the following description and accompanying drawing, and also to the appended claims in which the features of the invention believed to be novel are more particularly pointed out.

In the drawings:

Fig. 1 is a simplified drawing, partly in schematic form, of an apparatus for providing a determination of the moisture content of the atmosphere and incorporating a contact device embodying my invention.

Fig. 2 is an enlarged view of part of the apparatus of Fig. 1 embodying my invention.

Referring to Fig. 1, there is shown, a pair of spools 1 and 2, suitable for the winding thereon of a linen thread 3, which is initially wound entirely on spool 1. Spool 2 is rotated in the direction shown by the arrow through a suitable driving arrangement, not shown in the drawing, thereby winding the thread which travels at a fixed rate from spool 1 to spool 2. The thread is drawn through a pair of small openings 4 cut into the side walls of a tube 5 having a pair of flared ends opened to the atmosphere. Air is made to flow through the tube 5 in the direction indicated by the arrows 6 and 7.

Immediately upon its exit from the tube 5, the thread 2 passes through a pair of intermeshing gears 8 and 9 which are constructed of dissimilar substances occupying different levels in the electromotive series. In this particular embodiment, gear 8 consists of chemically pure zinc and gear 9 consists of carbon. The gears are mounted on suitable conducting shafts supported on non-conducting members 10 and 11 which serve as electrical insulators. Member 11 is pivoted at a point 12 and a spring 13 exerts a force upon it to maintain a constant pressure at the face of the gears. The gears are connected to the terminals of a meter 14 by means of suitable connections to the conducting shafts.

To measure the electrical conductivity of the moistened thread, meter 14 is provided. The meter circuit comprises conductor 17 connected to the conducting shaft 18 of gear 8 and through switch blade 19 and terminal 20 to one side of the meter. Conductor 21 connects the conducting shaft 22 associated with gear 9 to the other terminal of the meter. The current generated in the meter circuit is indicative of the moisture content and hence, resistivity of the thread portion contained between the intermeshing surfaces of the gear teeth. The meter 14, therefore, may comprise an ammeter to indicate the resistive condition of the thread portion contained between the intermeshing gear surfaces.

In operation, the spool 2, draws the thread through tube 5 at a fixed rate, so that it absorbs an amount of moisture, dependent on the water content of the atmosphere flowing through the tube. Immediately after its exit from the tube, the thread passes through the gears 8 and 9 causing an electrolytic action at the contact points which produces a voltage recorded by the meter 14. The deflection of the meter thus serves as an indication of the water content of the atmosphere.

The thread, in passing through the gears, prevents them from making direct contact with each other, and insures a positive contact on the part of both gears with the thread. Moreover, a certain amount of tension is exerted upon the thread as it is drawn between the gear teeth and assumes a configuration corresponding to that of the gears at the meshing point. This provides a wiping action which further insures a good electrical contact. While the embodiment shows the thread as being drawn through the gears by the rotation of spool 2, it is also perfectly feasible to drive the gears through some external means and use them to pull the thread, thereby eliminating the necessity for the spools.

Referring to Fig. 2, there is shown an enlarged view of the section of gears 8 and 9 at the points where the thread makes contact. In this particular embodiment, the teeth of the zinc gear 8 have been cut so as to provide sharp shoulders at points such as 15 and 16, to insure a pair of high pressure points when the thread is drawn therethrough. Moreover, this configuration insures that there are always at least two points of contact between the thread and the gears.

The contact device of Fig. 1 is also entirely suitable in the type of apparatus which measures simply the electrical resistance of the thread portion contained between the surfaces of the intermeshing gear teeth. In this type of apparatus, both gears are made of a similar substance which does not react chemically with the electrolyte, and the variation in resistance of the thread then serves as an indication of the moisture content of the atmosphere. This resistance is measured by connecting in series with the gears, a circuit containing a source of potential and an indicating meter. The meter circuit comprises according to Fig. 1 conductor 17 connecting the conductive shaft 18 associated with gear 8 through the switch blade 19 and terminal 23, battery 24 and one terminal of meter 14. The other conductor 21 connects the conductor shaft 22 associated with gear 9 directly to the other terminal of the meter 14. Meter 14 may comprise an ammeter which measures the current flow in the meter circuit. The current measured is indicative of the moisture content and hence, of the resistance of the thread portion contained between the intermeshing gear teeth.

With both types of apparatus, it has been found experimentally that a contact device such as I have shown in Fig. 1 provides a more constant contact with the thread, for the same amount of friction, than any other type of contact. This eliminates a considerable amount of fluctuation in the readings of the moisture indicating meter, and insures greater accuracy in the determination of the water content of the atmosphere.

While a specific embodiment has been shown and described, it will be understood that various modifications may be made without departing from the invention. The appended claims are, therefore, intended to cover any such modifications within the true spirit and scope of the invention.

What I claim as new and desire to secure by Letters Patent of the United States is:

1. A device for making an electrical contact to both sides of a moving thread, comprising a pair of members having moving intermeshing serrations, said thread traveling through said members at the intermeshing surfaces of said serrations and in electrical contact with said surfaces, and means for measuring the electrical resistance offered by said thread portions contacting said surfaces.

2. A device for making a pair of electrical contacts to both sides of a moving tape successively along the length of said tape, comprising a pair of intermeshing gears having electrically conductive teeth, said tape traveling through said gears at the intermeshing surfaces of said teeth, and means for measuring the electrical resistance of the thread portions contacting said surfaces.

3. A device for making a pair of contacts at adjacent points on both sides of a moving thread, comprising a pair of intermeshing gears, said thread being drawn through said gears at their contact surfaces in a manner to cause said gears to separate and means for measuring the electrical resistance of the thread portions contacting said surfaces.

4. A device for measuring the electrical resistance of a moving thread containing an electrolyte in varying degrees of dehydration, comprising a pair of intermeshing gears, means to draw said thread through said gears, a metering device, a source of electrical potential, and means for connecting said metering device, said source and the portion of the thread contacting said gears in a closed series electrical circuit.

5. A device for measuring the degree of moisture absorbed in portions of a moving thread containing a dehydrated electrolyte, comprising a pair of intermeshing gears consisting of dissimilar substances occupying different levels in the electromotive series, said thread being drawn through said gears at their contact faces, means to apply pressure to said gears in a direction perpendicular to said faces, and a meter for measuring the electromotive force produced between said gears through chemical interaction with said electrolyte.

6. A device for measuring the degree of moisture absorbed in portions of a moving thread containing a dehydrated electrolyte, comprising a pair of intermeshing gears consisting of dissimilar substances occupying different levels in the electromotive series, the teeth of one of said gears being undercut to provide high pressure contact points with said thread when it is drawn through said gears at their contact faces, means to apply pressure to said gears in a direct perpendicular to said faces, and a meter for measuring the electromotive force produced between said gears through chemical interaction with said electrolyte.

7. Electrical contact apparatus for a moving, electrically conductive filament comprising a pair of electrically conductive members having intermeshing serrations, means for driving said filament between the surfaces of said intermeshing serrations and in contact therewith, and a closed electrical circuit comprising said serrations and said filament contacting said surfaces.

FRANCIS B. WOESTEMEYER.

REFERENCES CITED

The following references are of record in the file of this patent:

UNITED STATES PATENTS

| Number | Name | Date |
| --- | --- | --- |
| 1,903,716 | Kalle | Apr. 11, 1933 |
| 2,400,920 | Cummings | May 28, 1946 |